United States Patent [19]
Patterson et al.

[11] Patent Number: 6,059,081
[45] Date of Patent: May 9, 2000

[54] POWER ACCESSORIES FOR A RADIOTELEPHONE HAVING A RETRACTABLE POWER CORD

[75] Inventors: Gregory S. Patterson; Kimberly R. Krumenacker, both of Raleigh, N.C.

[73] Assignee: Ericsson, Inc., Research Triangle Park, N.C.

[21] Appl. No.: 09/014,003

[22] Filed: Jan. 27, 1998

[51] Int. Cl.[7] .................................................. H02G 11/00
[52] U.S. Cl. .............................. 191/12.2 R; 191/12.2 A; 191/12.4
[58] Field of Search ............................ 191/12.2 R, 12.4, 191/12.2 A; 320/111

[56] References Cited

U.S. PATENT DOCUMENTS

| | | | |
|---|---|---|---|
| 4,350,850 | 9/1982 | Kovacik et al. | 191/12.2 R |
| 4,713,497 | 12/1987 | Smith | 191/12.2 R |
| 5,101,082 | 3/1992 | Simmons et al. | 191/12.2 R |
| 5,180,040 | 1/1993 | Ji | 191/12.2 R |
| 5,453,585 | 9/1995 | Lenz et al. | 191/12.2 R |
| 5,535,960 | 7/1996 | Skowronski et al. | 191/12.2 R |
| 5,923,147 | 7/1999 | Martensson | 320/111 |

*Primary Examiner*—S. Joseph Morano
*Assistant Examiner*—Robert J. McCarry, Jr.
*Attorney, Agent, or Firm*—Coats & Bennett, P.L.L.C.

[57] ABSTRACT

A power accessory for a powered device includes a retractable power cord. The power accessory includes a housing having an outlet opening, a power circuit contained within the housing, a power input connected to the power circuit, an outlet cord passing through the outlet opening in the housing having a first end connected to the power circuit and a second end adapted to connect to the powered device, and a retraction assembly contained within the housing for retracting the outlet cord into the housing when the power accessory is not in use. The power circuit is embodied in a printed circuit board. Both the power circuit and power input are mounted to said retraction assembly so as to rotate with the retraction assembly. Thus, there is no need for slip rings to make electrical connection between various electrical components.

43 Claims, 7 Drawing Sheets

POWER ACCESSORIES FOR A RADIOTELEPHONE HAVING A RETRACTABLE POWER CORD

FIELD OF THE INVENTION

The present invention relates generally to power accessories, such as power adapters and battery chargers, for a radiotelephone, and more particularly, to cord management features for such power accessories.

BACKGROUND OF THE INVENTION

A rechargeable battery is commonly used to power a handheld, cellular telephone or other electronic appliance. When the battery power is depleted, the battery can be removed from the radiotelephone and replaced by another fully charged battery. The depleted battery can be placed in a battery charger to recharge the battery. Alternatively, a power adapter that connects the radiotelephone to an external power source can power the cellular telephone.

Both battery chargers and power adapters typically include a relatively long power cord that plugs into an electrical outlet, such as a cigarette lighter or wall outlet. Most battery chargers and power adapters do not include any means for power cord management when the battery charger or power adapter is not in use. In such circumstances, the user will typically wrap the power cord around the device or otherwise coil the cord and secure it with a rubber band or tie. These methods of securing the power cord have several drawbacks. First, it is an inconvenience to the consumer to have to wrap or coil the power cord and secure it for storage or transportation. If consumers fail to wrap or coil the cord, it may be damaged during transportation. Even if the cable is wrapped or coiled, there is no way to control the bend radius of the power cord. Consequently, the power cord will be susceptible to fatigue and separation of the cord.

Accordingly, there is a need for a power accessory for a cellular telephone that allows the power cord to be conveniently stored during periods of nonuse or transportation in a manner that will prevent damage to the power cord.

SUMMARY AND OBJECTS OF THE INVENTION

The present invention relates to battery chargers, power adapters, and other power accessories for radiotelephones. The power accessory of the present inventions includes a housing containing a power circuit, a power cord connected to the power circuit which passes through an opening in the housing, and a retraction assembly for retracting the power cord into the housing when the power accessory is not in use. The power cord is wound around a spool that forms a part of the retraction assembly. As the power cord is pulled out of the housing, the power cord unwinds from the spool. When the power cord is released, a biasing member rotates the spool to automatically wind the power cord back onto the spool. A locking mechanism may be provided to lock the spool against rotation and prevent the power cord from retracting while the accessory is in use.

In a preferred embodiment of the invention, the power circuit and input source for the power circuit are both mounted on the retraction assembly for rotation therewith. The input source for the power circuit is a swivel plug which mates with a standard 115volt wall outlet. Mounting the power circuit and input source on the retraction assembly eliminates relative movement between electrical components and consequently, eliminates the need for slip ring connections which are more costly and less reliable than the present invention.

In another aspect of the present invention, a tensioning member is provided to adjust the amount of tension exerted by the biasing member on the retraction assembly. The biasing member comprises a clock spring. One end of the clock spring is fixed to the tensioning member which may be rotated relative to the retraction assembly. When the tensioning member is rotated, the clock spring is tightened to apply greater force to the retraction assembly. The tensioning member is designed to rotate only in a single direction.

DETAILED DESCRIPTION OF THE INVENTION

Referring now to the drawings, a battery charger produced in accordance with the present invention is shown and indicated generally by the numeral 10. The battery charger 10 generally includes a housing 20, a charging circuit 50 including a retractable outlet cord 52 contained within the housing 20, a retraction assembly 60 including a winding spool 90 for retracting the outlet cord 52 into the housing 20, and a tensioning member 120 for pre-loading the winding spool 90.

Figure 1:
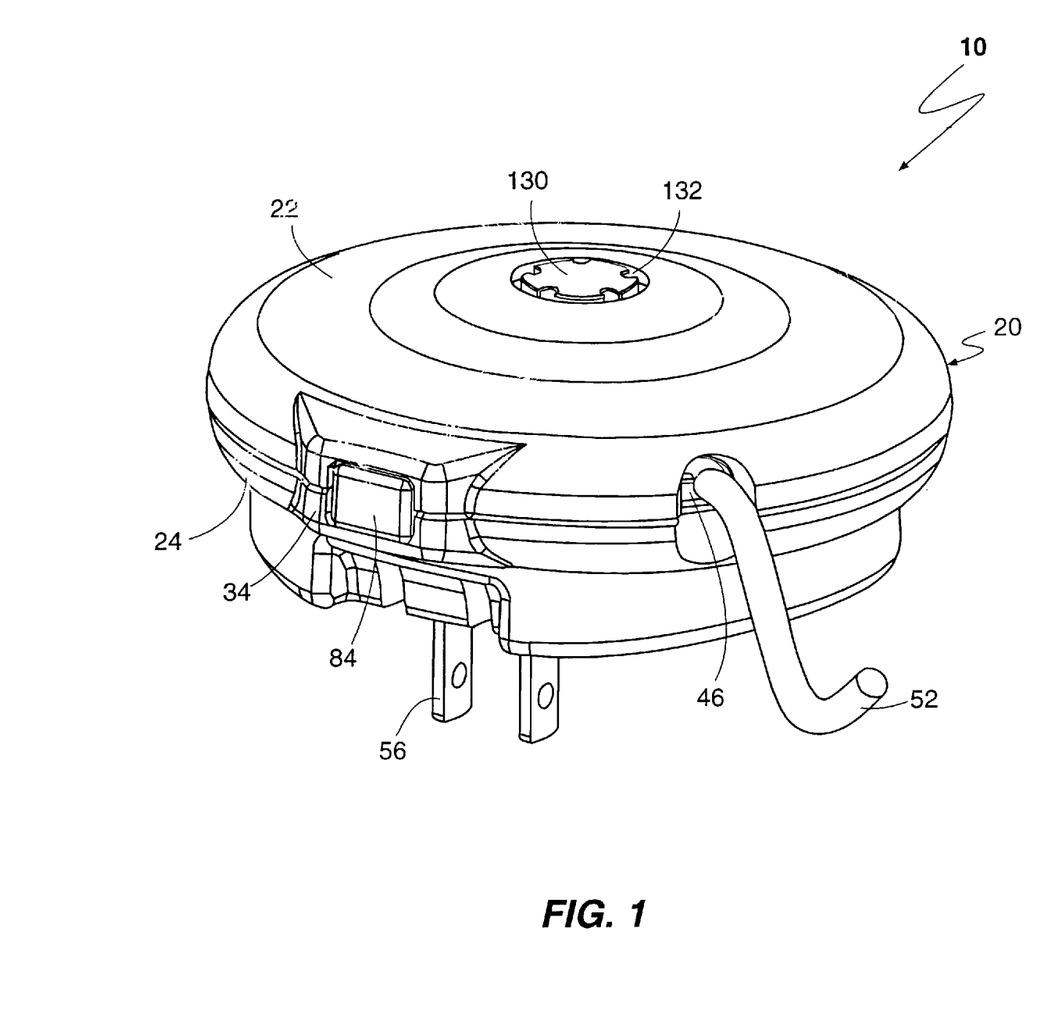
FIG. 1 is a perspective view showing a battery charger produced in accordance with the present invention.
Figure 2:
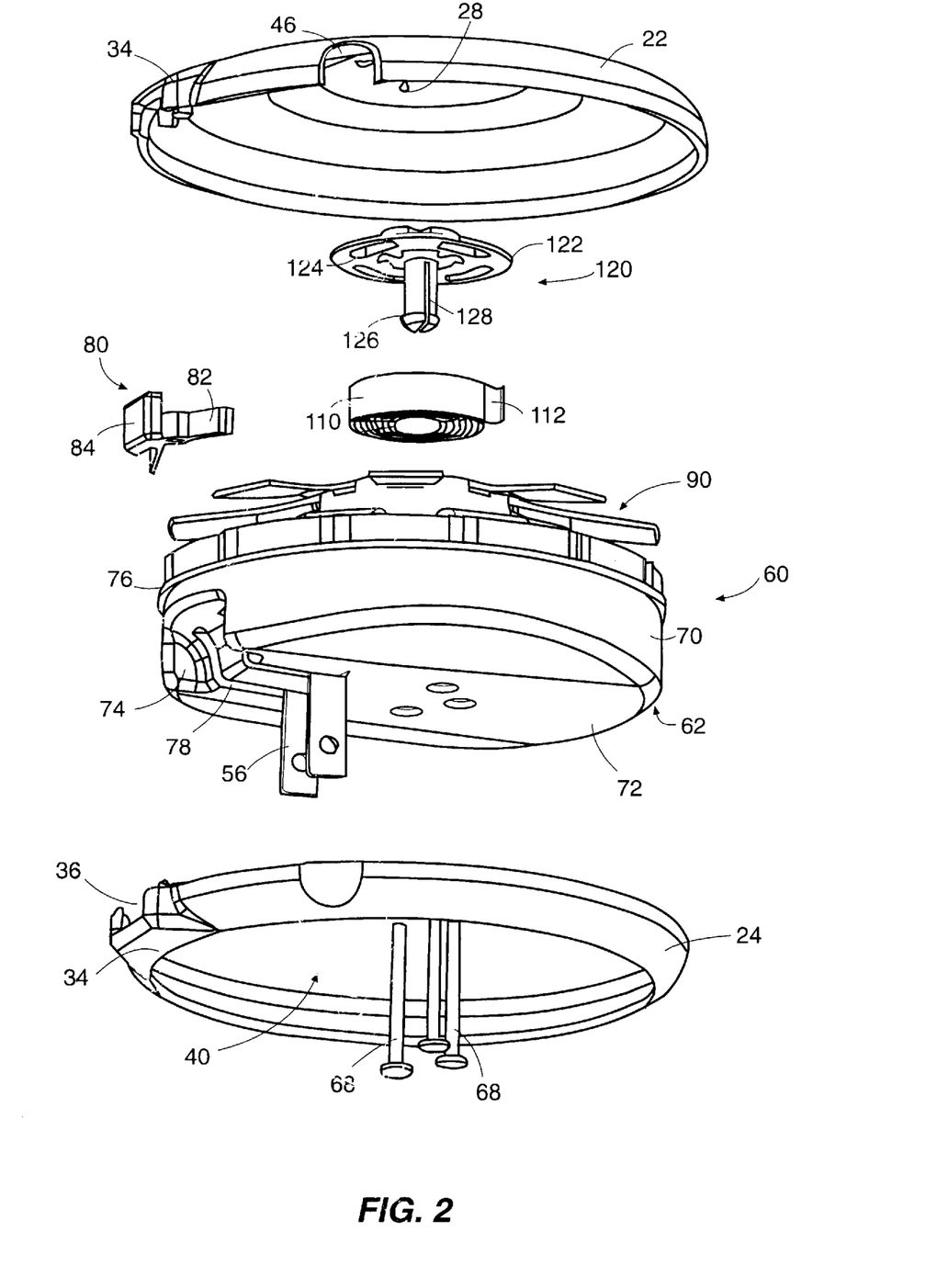
FIG. 2 is an exploded perspective view of the battery charger as seen from the bottom.
Figure 3:
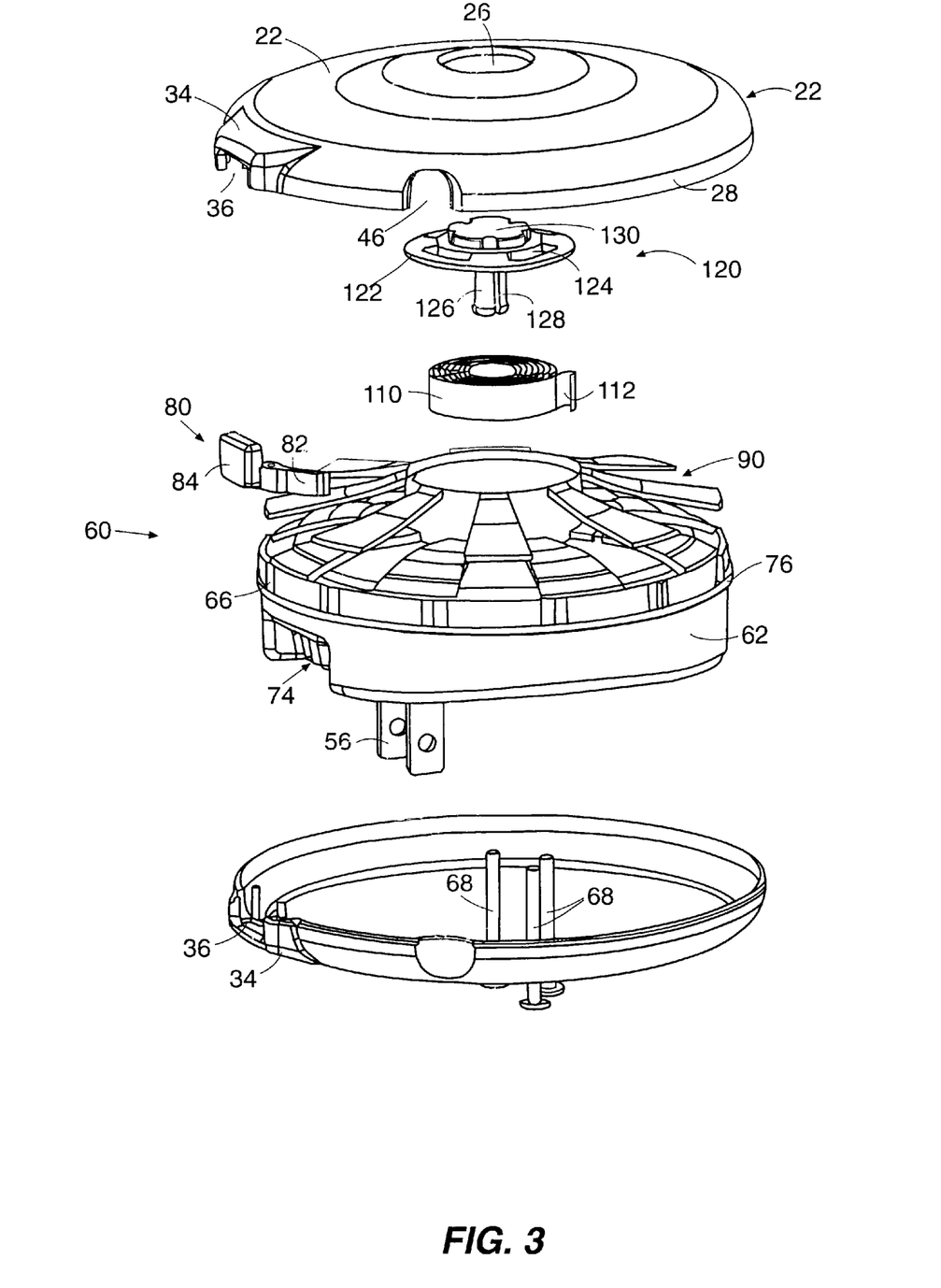
FIG. 3 is an exploded perspective view of the battery charger as seen from the top.

In this example, the housing 20 is a two-piece construction comprising a top portion 22 and a bottom portion 24. The top portion 22 includes a small central opening 26. A series of teeth 28 are circumferentially spaced on the inner surface of the top portion 22 as can be seen in FIG. 2. The purpose of the central opening 26 and teeth 28 will be described below. The bottom portion 24 of the housing 20 has a ring-like configuration which defines a large opening 40 that exposes the retraction assembly 60. The top and bottom portions 22 and 24 may be joined by ultrasonic welding, adhesives, snaps, or may be press-fit. When assembled, the housing 20 has a generally saucer-like configuration with a button compartment 34 on the perimeter of the housing 20. The button compartment 34 has an opening 36 to accommodate a release button as will be hereinafter described. A cable opening 46 is also formed in the housing 20 to allow the outlet cord 52 to exit the housing 20.

The charging circuit 50 is entirely conventional and is preferably embodied in a printed circuit board 54 mounted within the housing 20. The charging circuit 50 uses current switching technology, which is well known in the art, to convert the input current (in this case AC) to an output current (in this case DC). The printed circuit board 54 is mounted in the retraction assembly 60 so as to rotate with the retraction assembly 60. The input source for the charging circuit 50 is a swivel-plug 56 that plugs into a standard 115 volt AC wall outlet. As will be described more fully below, the swivel plug 56 is movable between extended and retracted portions. When in the extended position, the swivel plug 56 makes electrical connection with contacts 58 on the printed circuit board 54. The outlet cord 52 plugs into an electronic device having rechargeable batteries to apply the output current generated by the charging circuit 50 to the batteries.

Figure 4:
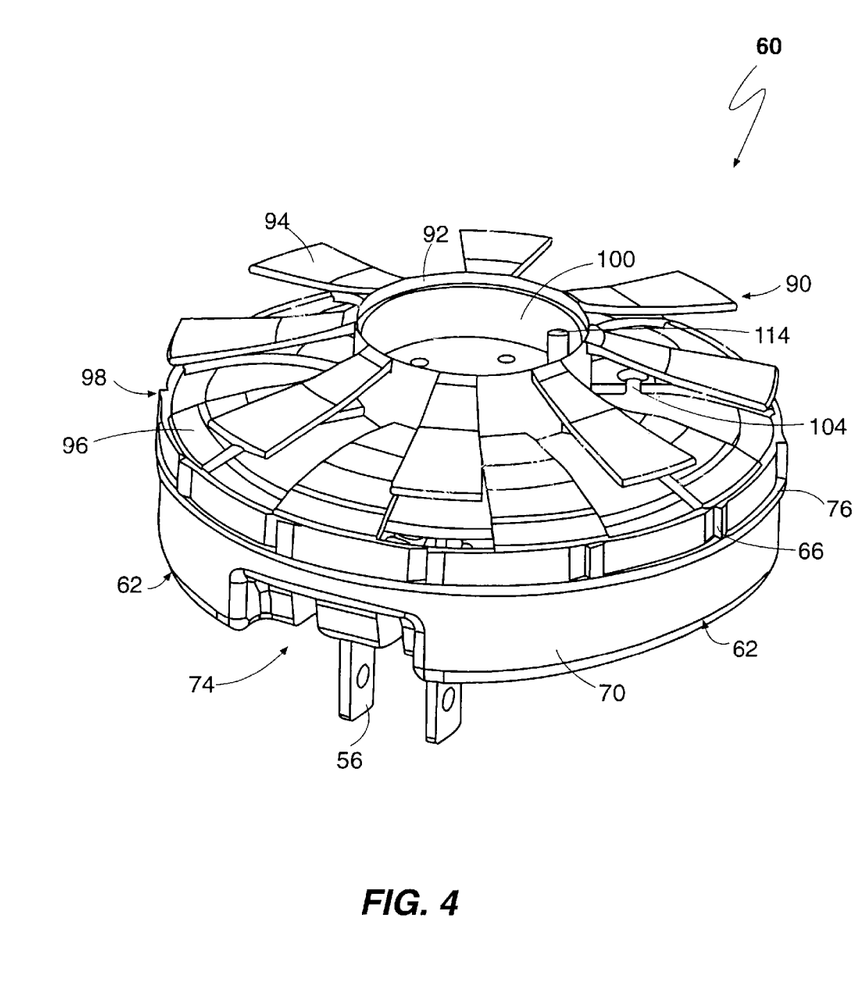
FIG. 4 is a perspective view of the retraction assembly.
Figure 5:
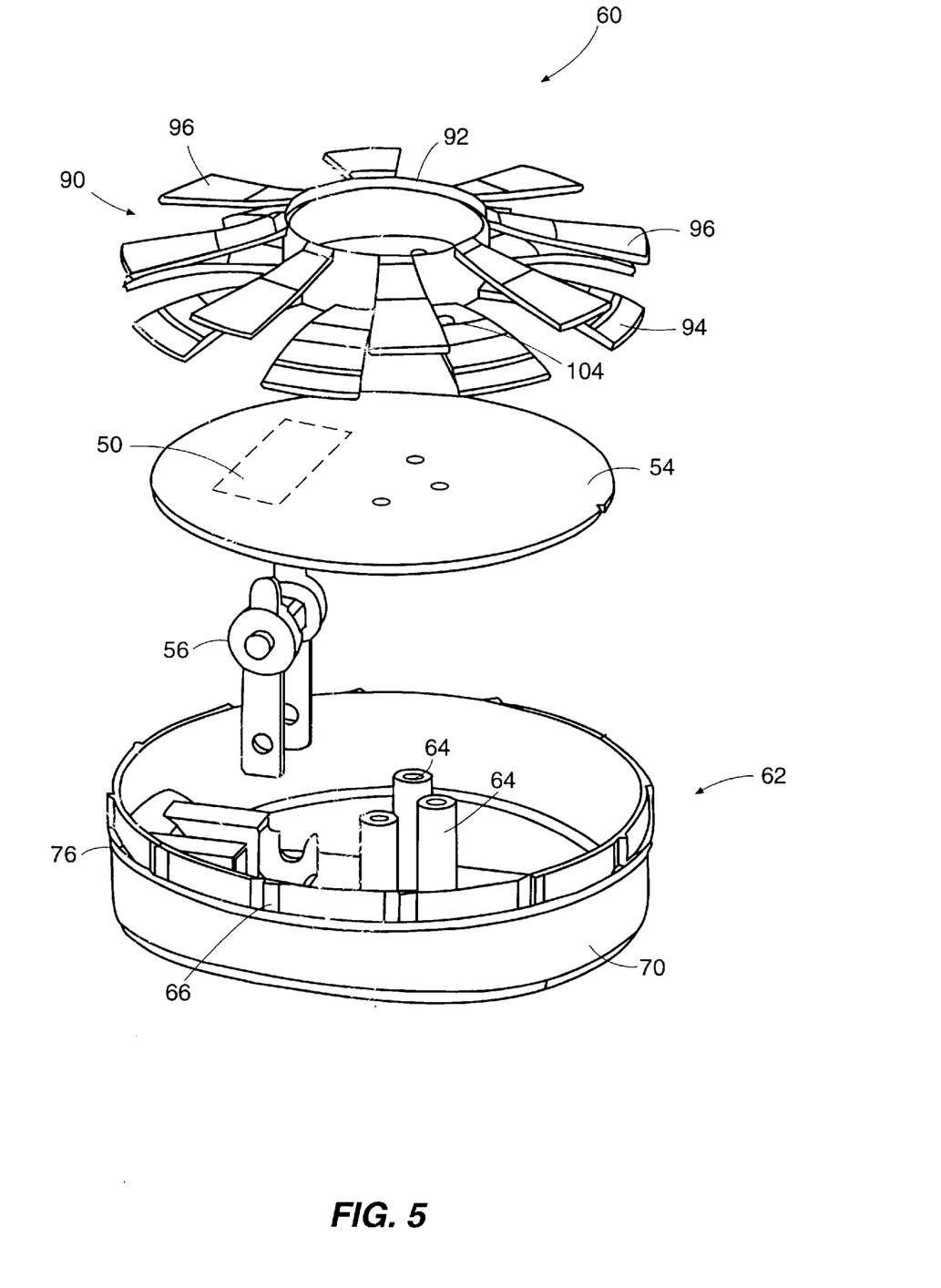
FIG. 5 is an exploded perspective view of the retraction assembly.
Figure 6:
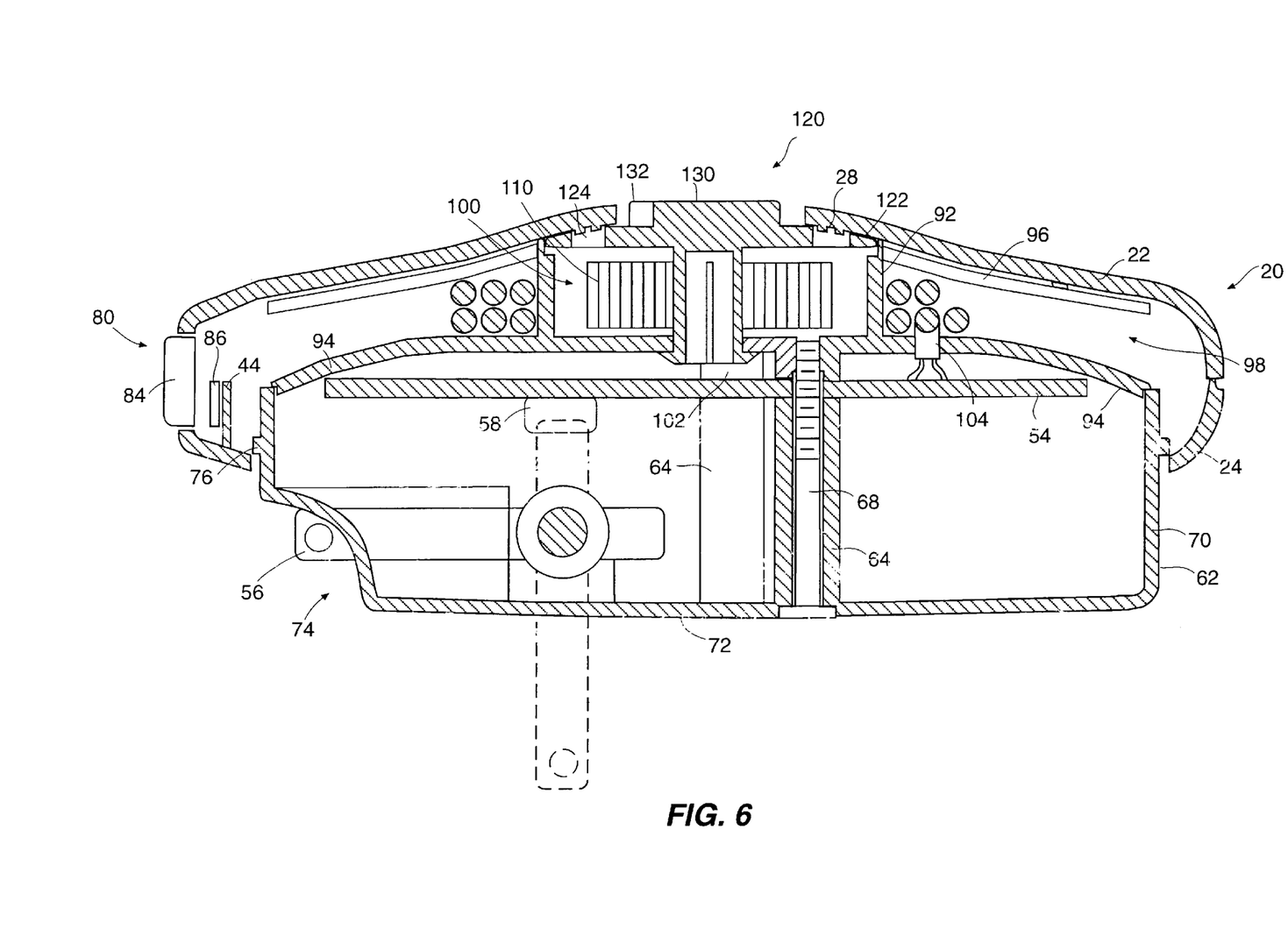
FIG. 6 is a cross-section of the battery charger.
Figure 7:
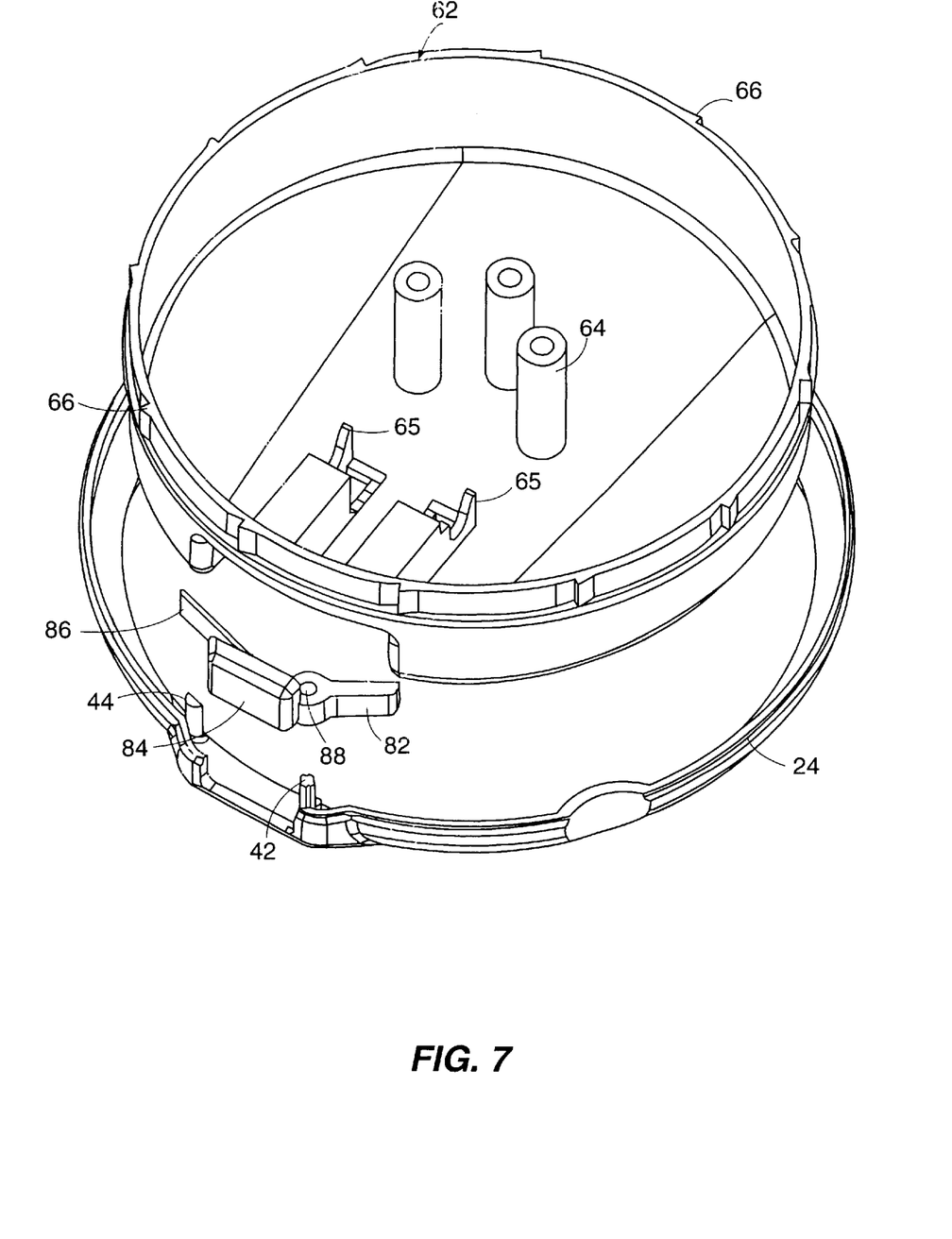
FIG. 7 is a perspective view of the lower part of the housing and the rotor as seen from the top.

Referring now to FIGS. 4 through 6, the retraction assembly 60 is shown. The retraction assembly 60, is rotatably mounted within housing 20. The retraction assembly 60 carries the charging circuit 50 and swivel plug 56, both of which rotate with the retraction assembly 60. This feature of the invention eliminates the need for a slip ring connection.

The retraction assembly 60 includes a rotor 62, a winding spool 90, and a biasing member 110. The rotor 62 provides a structure on which to mount the electrical components. The rotor 62 has a sidewall 70 and a bottom wall 72. Three support columns 64 extend upward from the bottom wall 72 of the rotor 62. The printed circuit board 54 mounts on top of the support columns 64 and is secured by screws 68 which thread into openings in the winding spool 90 as shown most clearly in FIG. 6. Flange 76 extends around the periphery of the rotor 62 which engages the bottom portion 24 of housing 20 thus supporting the rotor 62 within housing 20.

The swivel plug 56 is mounted to mounts 65 on the bottom 72 of the rotor 62 so that the prongs of the swivel plug 56 pass through slots 78 in the rotor 62. A recess 74 is formed in the rotor 62 to expose the prongs when the swivel plug 56 is in a retracted position. When the swivel plug 56 is in the retracted or storage position, the bottom end of the prongs extend into the recess 74. The user may reach into the recess 74 and pull the prongs downward to place the swivel plug 56 in the extended or use position (shown in dotted lines in FIG. 6). When the swivel plug 56 is in the extended position, the bottom end of the prongs extend downward from the rotor 62 through slots 78. The top end of the prongs extend upward to engage the contacts 58 on the under side of the printed circuit board 54 to make an electrical connection with the power circuit 50.

The winding spool 90 is mounted on top of the printed circuit board 54. The winding spool 90 includes a central hub 92 and two sets of vanes 94 and 96 that project outwardly from the hub 92 in spaced relation to one another. The vanes 94 and 96 define a channel 98 for the outlet cord 52. The outlet cord 52 is wound on the hub 92 in the channel 98 between the vanes 94 and 96. The lower set of vanes 94 and upper set of vanes 96 are staggered with respect to one another. The vane geometry allows manufacture of the winding spool 90 without the need for side action in the mold. One vane in the lower set of vanes 96 includes an opening 104 to hold the end of the outlet cord 52 without loading the solder connection to the printed circuit board 54 preventing the leads of the outlet cord 52 from breaking or pulling away from the printed circuit board 54. The outlet cord 52 may be secured in opening 104 by any suitable means such as a crimp-type connector.

The hub 92 of the winding spool 90 defines a cavity 100 for the biasing member. Spacers 102 are integrally formed on the underside of winding spool 90 to support the winding spool 90 in spaced relation to the printed circuit board 54. Spacers 102 include a threaded opening which are engaged by screws 68 to secure the winding spool 90 to the rotor 62.

The biasing member 110, which comprises a clock spring, is contained in the hub 92 of the winding spool 90. The inner end of the spring 110 is held by the tensioning member 120 as will be hereinafter described. The outer end of the spring 110 is formed into a loop 112 that fits around a spring post 114 in the hub 92 of the winding spool 90. Thus, the spring 110 is fully constrained by the winding spool 90 and tensioning member 120. When the outlet cord 52 is pulled out of the housing 20, the winding spool 90 rotates causing the spring 110 to tighten. When the cord 52 is released, the spring 110 applies a rotational force to the winding spool 90 causing the cord 52 to retract into the housing 20.

A locking mechanism 80 may be provided to allow the user to lock the retraction assembly 60 against rotation with respect to housing 20 when the outlet cord 52 is extended. The locking mechanism 80 comprises a lever 82 which engages with a series of ratchet teeth 66 on the rotor 62. The lever 82 includes a thumb pad 84 on one end which can be pressed by the user to release the retraction assembly. The lever 82 includes an opening 88 that fits over a peg 42 on the bottom portion 24 of the housing 20. Thus the lever 82 pivots about the axis of the peg 42. The lever 82 also includes a resilient finger 86. The resilient finger 86 presses against a biasing post 44 on the bottom portion 24 at the housing 20 to bias the end of the lever 82 into engagement with the ratchet teeth 66 on the rotor 62. When the button 84 is pressed, the finger 86 is deflected inward and the lever 82 moves away from the rotor 62 allowing the rotor 62 to rotate freely under the force of the biasing member 110.

The tensioning member 120 comprises a disk 122 having slots 124. A stub member 126 extends downward from the underside of the disk 122 into the hub 92 of the winding spool 90. The stub member 126 mates with the center of the spring 110 and includes a slot 128 which holds the inner end of the spring 110. The end of the stub member 126 passes through a corresponding opening in the bottom of the hub 92 and includes a snap feature to hold the tensioning member 120 in place. A head 130 is disposed on the top surface of the disk 122. The head 130 has a series of indentations 132 to receive a tool to adjust the tension on the clock spring 110. The head 130 is sized to fit into the opening 26 in the top portion 22 of housing 20. Thus the opening 26 serves to axially locate the tensioning member 120 within the housing 20.

To tension the spring 110, a tool is used to engage the indentations 132 of the head 130 and rotate the tensioning member 120 in a clockwise direction. When the tensioning member 120 is rotated clockwise, the slots 124 pass over the teeth 28 in the top portion 22 of housing 20. The teeth 28 are formed to prevent the tensioning member 120 from rotating in a counterclockwise direction. The retraction assembly 60 is prevented from turning by the outlet cord plug (not shown) which is larger than the opening 46 in housing 20. Thus, rotation of the tensioning member 120 in a clockwise direction causes the spring 110 to tighten thereby increasing the amount of force that the spring 110 exerts on the winding spool 90. The spring 110 should be pre-loaded or tightened sufficiently so that the outlet cord 52 will be fully retracted when released.

To use the battery charger 10 as described herein, the end user would pull the outlet cord 52 to unwind the outlet cord 52 from the winding spool 90 until the desired length of cord 52 is unwound. The locking mechanism 80 will automatically lock the winding spool 90 in place to prevent the cord 52 from retracting into the housing 20. After the cord 52 is unwound, the swivel plug 56 would be pivoted from the storage position to an extended position and then plugged into a wall outlet. The outlet cord 52 would be plugged into the device that is being powered.

To store the battery charger 10, the outlet cord 52 and swivel plug 56 would be unplugged. The swivel plug 56 would be returned to the storage position. The locking mechanism 80 would be released allowing the cord 52 to automatically retract into the housing 20.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A power accessory for a powdered device comprising:
   a) a housing having an outlet opening;
   b) a power input for receiving an input power signal;
   c) a power circuit contained within said housing and connected to said power input for conditioning said input power signal to generate an output power signal;
   d) an outlet cord passing through said outlet opening in said housing having a first end connected to said power circuit and a second end adapted to connect to said powered device for supplying said output power signal to said powered device: and
   e) a retraction assembly contained within said housing for retracting said outlet cord into said housing when said power accessory is not in use and for paying out said outlet cord when said power accessory is in use, wherein said retraction assembly is rotatably mounted in said housing and said power circuit is mounted to said retraction assembly so as to rotate with said retraction assembly.

2. The power accessory according to claim 1 wherein said power input comprises a plug adapted to mate with a standard wall outlet.

3. The power accessory according to claim 2 wherein said plug is movable between a storage position and a use position.

4. The power accessory according to claim 3 wherein said plug is a swivel plug.

5. The power accessory according to claim 1 wherein retraction is rotatably mounted in said housing.

6. The power accessory according to claim 5 wherein said retraction assembly includes a winding spool and wherein said outlet cord is wound onto said winding spool.

7. The power accessory according to claim 6 wherein said retraction assembly includes a biasing member to bias the winding spool to retract the outlet cord into said housing.

8. The power accessory according to claim 7 wherein the biasing member is a spring.

9. The power accessory according to claim 8 wherein said spring is a torsional spring disposed in said winding spool.

10. The power accessory according to claim 9 further including an adjusting mechanism for adjusting the amount of force exerted by the spring on the winding spool.

11. The power accessory according to claim 10 wherein the adjusting mechanism comprises a rotatable tensioning member engaged with said spring for tightening said spring when rotated in a first direction.

12. The power accessory according to claim 11 wherein said adjusting mechanism includes means to prevent said tensioning member from rotating in a second direction.

13. The power accessory according to claim 5 wherein said power circuit is embodied in a printed circuit board mounted to said retraction assembly so as to rotate with said retraction assembly.

14. The power accessory according to claim 13 wherein said power input is mounted to said retraction assembly so as to rotate with said retraction assembly.

15. A power accessory for a powered device comprising:
    a) a housing having an outlet opening;
    b) a power circuit contained within said housing;
    c) a power input connected to said power circuit;
    d) an outlet cord passing through said outlet opening in said housing having a first end connected to said power circuit and a second end adapted to connect to said powered device;
    e) a retraction assembly contained within said housing for retracting said outlet cord into said housing when said power accessory is not in use and for paying out said outlet cord when said power accessory is in use;
    f) wherein said power circuit and outlet cord are mounted for rotation with said retraction assembly.

16. The power accessory according to claim 15 wherein said power input comprises a plug adapted to mate with a standard wall outlet.

17. The power accessory according to claim 16 wherein said plug is movable between a storage position and a use position.

18. The power accessory according to claim 17 wherein said plug is a swivel plug.

19. The power accessory according to claim 15 wherein said retraction is rotatably mounted in said housing.

20. The power accessory according to claim 19 wherein said retraction assembly includes a winding spool and wherein said outlet cord is wound onto said winding spool.

21. The power accessory according to claim 20 wherein said retraction assembly includes a biasing member to bias the winding spool to retract the outlet cord into said housing.

22. The power accessory according to claim 21 wherein the biasing member is a spring.

23. The power accessory according to claim 22 wherein said spring is a torsional spring disposed in said winding spool.

24. The power accessory according to claim 23 further including an adjusting mechanism for adjusting the amount of force exerted by the spring on the winding spool.

25. The power accessory according to claim 24 wherein the adjusting mechanism comprises a rotatable tensioning member engaged with said spring for tightening said spring when rotated in a first direction.

26. The power accessory according to claim 25 wherein said adjusting mechanism includes means to prevent said tensioning member from rotating in a second direction.

27. A power accessory for a powered device comprising:
    a) a housing having an outlet opening;
    b) a power circuit contained within said housing for conditioning an input power signal to generate an output power signal;
    c) a power plug operatively connected to said power circuit;
    d) a power cord passing through said outlet opening in said housing having a first end connected to said power circuit and a second end terminating in an electrical connector;
    f) a retraction assembly contained within said housing for retracting said power cord into said housing when said power accessory is not in use and for paying out said power cord when said power accessory is in use, wherein said retraction rotatably mounted in said housing and said power circuit being mounted to said retraction assembly so as to rotate with said retraction assembly.

28. The power accessory according to claim 27 wherein said power cord is an outlet cord adapted to connect to said powered device.

29. The power accessory according to claim 28 wherein said retraction assembly includes a winding spool and wherein said outlet cord is wound onto said winding spool.

30. The power accessory according to claim 29 wherein said retraction assembly includes a biasing member to bias the winding spool to retract the outlet cord into said housing.

31. The power accessory according to claim 30 wherein the biasing member is a spring.

32. The power accessory according to claim 31 wherein said spring is a torsional spring disposed in said winding spool.

33. The power accessory according to claim 32 further including an adjusting mechanism for adjusting the amount of force exerted by the spring on the winding spool.

34. The power accessory according to claim 33 wherein the adjusting mechanism comprises a rotatable tensioning member engaged with said spring for tightening said spring when rotated in a first direction.

35. The power accessory according to claim 34 wherein said adjusting mechanism includes means to prevent said tensioning member from rotating in a second direction.

36. The power accessory according to claim 27 wherein said power circuit is embodied in a printed circuit board mounted to said retraction assembly so as to rotate with said retraction assembly.

37. A power accessory for a powered device comprising:
 a) a housing having a cord opening;
 b) a cord retraction assembly including a cord reel contained within said housing;
 c) a power cord passing through said cord opening in said housing and wound around said cord reel;
 d) a power circuit electrically connected to said power cord for conditioning an input power signal to generate an output power signal, wherein said power circuit is mounted to said cord retraction assembly so as to rotate with said cord retraction assembly.

38. The power accessory of claim 37 wherein said power cord is an output power cord for supplying power to said powered device.

39. The power accessory of claim 37 wherein said power circuit comprises a charging circuit for recharging said powered device.

40. The power accessory of claim 37 further including an power plug mounted to said retraction assembly for rotation with said retraction assembly, said power plug being electrically connected to said power circuit.

41. The power accessory of claim 40 wherein said power plug is movable between a deployed position and a storage position.

42. A power accessory comprising;
 a) a housing having a cord opening;
 b) a cord retraction assembly including a cord reel contained within said housing;
 c) a power plug mounted to said cord retraction assembly so as to rotate with said cord retraction assembly; and
 d) a power cord wound around said cord reel and electrically connected to said power plug, wherein said power cord passes through said cord opening in said housing.

43. The power accessory of claim 42 wherein said power plug is movable between a deployed position and a storage position.

* * * * *